UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BLUE COLORING-MATTER AND PROCESS OF MAKING SAME.

SPECIFICATION forming part of Letters Patent No. 506,284, dated October 10, 1893.

Application filed May 9, 1893. Serial No. 473,578. (No specimens.)

*To all whom it may concern:*

Be it known that we, MORITZ ULRICH and JOHANN BAMMANN, chemists and doctors of philosophy, (assignors to the FARBENFABRIKEN, VORMALS FR. BAYER & CO., of Elberfeld,) residing at Elberfeld, Prussia, Germany, have invented a new and useful Improvement in the Manufacture of Blue Coloring-Matters; and we do hereby declare the following to be an exact and clear description of our invention.

The resulting coloring-matters have the following general formula, (in which: —R—R— signifies the radical of the tetrazotized tolidin or dianisidin:)

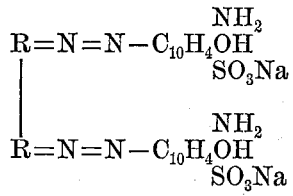

Our invention relates to the manufacture of coloring-matter producing on unmordanted cotton from blue to greenish-blue shades (fast to the action of alkali and acid) resulting from the reaction of one molecular proportion of the tetrazocompound of tolidin or dianisidin with two molecular proportions of 1:8 amidonaphthol-alpha mono sulfo acid ($NH_2$:$SO_3H$:OH=1:4:8) in an alkaline solution.

In carrying out our invention practically we can proceed as follows: 5.3 parts, by weight, of tolidin (or the corresponding quantity of dianisidin) are converted in the well known manner with twelve parts, by weight, of hydrochloric acid (25° Baumé) and 3.5 parts, by weight, of sodium nitrite into the tetrazocompound. Fifteen parts, by weight, of the sodium salt of amidonaphthol alpha mono sulfo acid ($NH_2SO_3H$:OH=1:4:8) are dissolved in three hundred parts, by weight, of water with the addition of thirty parts, by weight, of sodium carbonate ($Na_2CO_3$). The aforesaid tetrazo solution is poured into the alkaline solution of the amidonaphthol sulfo acid, carefully cooling by means of ice. The formation of the new dye-stuff begins almost directly and is completed by allowing the reaction mixture to stand for about twenty-four hours at ordinary temperature that is to say at from about 10° to 20° centigrade. Then, the mixture is slowly heated to about 60° centigrade. The new dye-stuff is separated by means of common salt and is filtered off, pressed and dried.

The coloring-matter thus obtained forms a dark powder with metallic luster, easily soluble in water with a violet-blue color, soluble in ammonia with a blue color, insoluble in concentrated sodium carbonate and soda-lye. By concentrated sulfuric acid (66° Baumé) it is dissolved with a greenish-blue color, first turning into red on adding ice-water to the sulfuric acid solution. The free sulfo acid of the coloring-matter then being separated in bluish-violet flakes from the sulfuric acid solution, it produces on unmordanted cotton bright blue shades fast against the action of alkalies and acids.

Having thus described our invention and in what manner the same is to be performed, what we claim as new, and desire to secure by Letters Patent, is—

1. The process for the production of blue coloring-matters by causing one molecular proportion of the tetrazo compound of tolidin or dianisidin to act on two molecular proportions of 1:8—amidonaphthol alpha mono sulfo acid ($NH_2$:$SO_3H$:OH=1:4:8) in an alkaline solution.

2. As a new manufacture the coloring-matters having the general formula:

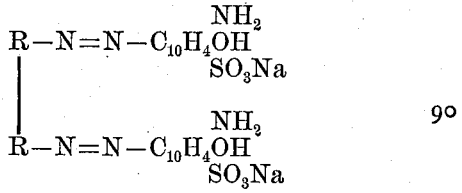

(in which formula —R—R— signifies the radical of the tetrazotized tolidin or dianisidin) and which is easily soluble in water with a violet-blue color, insoluble in concentrated sodium carbonate and soda-lye, forming with concentrated sulfuric acid (66° Baumé) from blue to greenish-blue solution, the latter first turning into red on the addition of ice-water, and then a blue flaky precipitate being separated, producing on unmordanted cotton from blue to greenish-blue shades fast to the action of alkali and acid, and being further diazotizable, when fixed on the fiber, substantially as described.

In testimony whereof we have signed our names in the presence of two subscribing witnesses.

MORITZ ULRICH.
JOHANN BAMMANN.

Witnesses:
WILLIAM ESSENWEIN,
RUDOLPH FRICKE.